United States Patent [19]

Pernicano

[11] Patent Number: 4,530,872

[45] Date of Patent: Jul. 23, 1985

[54] TRANSFER HAVING ADHESIVE PASTE COAT

[76] Inventor: Vincent S. Pernicano, 2833 Railroad St., Boyne Falls, Mich. 49713

[21] Appl. No.: 431,225

[22] Filed: Sep. 30, 1982

[51] Int. Cl.[3] .......................... B32B 3/18; B32B 5/16

[52] U.S. Cl. .................................. 428/200; 428/206; 428/207; 428/323; 428/327; 428/349; 428/355; 428/913; 428/914

[58] Field of Search ............... 428/349, 355, 325, 327, 428/204, 207, 914, 913, 200, 206, 323, 211; 350/98; 156/330, 331, 239, 240, 230

[56] References Cited

U.S. PATENT DOCUMENTS 3,540,978 11/1970 Ames .................................. 428/325
4,248,500 2/1981 Pernicano et al. .................... 350/98
4,374,890 2/1983 Shimizu et al. ................. 428/355 X
4,415,649 11/1983 Munger et al. ................. 428/355 X

*Primary Examiner*—Thomas J. Herbert
*Attorney, Agent, or Firm*—Reising, Ethington, Barnard, Perry & Milton

[57] ABSTRACT

A heat transfer sheeting combination of the type for being applied onto a fibrous article (10) to imprint a design coating (14) thereon including a substrate (12), a design coating (14) disposed on the substrate (12), and an adhesive layer (24) disposed on the design coating (14). The adhesive layer (24) is responsive to heat and pressure for adhesively securing the design coating (14) to the article (10) and characterized by the adhesive layer (24) being a paste including a nylon resin and a polyester resin and an epoxy resin.

20 Claims, 3 Drawing Figures

TRANSFER HAVING ADHESIVE PASTE COAT

TECHNICAL FIELD

The instant invention relates to heat transfer sheeting of the type including a design coating disposed on a substrate and an adhesive outer layer. Heat applied to the substrate side of the sheeting transfers the design coating to an article, the adhesive securing the design coating to the article.

BACKGROUND ART

Various adhesives have been formulated for adhesively securing a design coating of a heat transfer to the surface of an article. It is recognized that specific adhesives provide a stronger bond to specific materials which comprise the articles. A strong bond to nylon articles, such as nylon jackets, has been elusive to the art. Furthermore, it is desirable to work with an adhesive which can be screen-printed onto the transfer, thereby applying a minimum of wasted adhesive to the transfer and requiring no cleaning of excess adhesive from the printed heat transfer sheetings. To accomplish this, adhesives comprising multiple components have been made.

The U.S. Pat. No. 3,540,978 to Ames provides an example of an adhesive or glue containing several resin components. The U.S. Pat. No. 4,248,500 to Pernicano et al discloses a binder layer having a powdered adhesive printed thereon. The powdered adhesive comprises a thermal setting plastic such as polyester. There remains a need in the art for an adhesive which forms a strong bond to nylon but is also flexible when set and is of a consistency to be applied by a silk screen process.

SUMMARY OF THE INVENTION

According to the present invention there is provided a heat transfer sheeting combination of the type for being applied onto a fibrous article to imprint a design thereon, the combination including a substrate and a design coating disposed on the substrate. An adhesive layer is disposed on the design coating for adhesively securing the design coating to the article. The combination is characterized by the adhesive being a paste including a nylon resin and a polyester resin and an epoxy resin.

BRIEF DESCRIPTION OF THE DRAWINGS

An embodiment of a heat transfer sheeting combination constructed in accordance with the present invention will now be described by way of example only, with reference to the accompanying drawings in which.

DETAILED DESCRIPTION OF THE DRAWINGS

Figure 1:
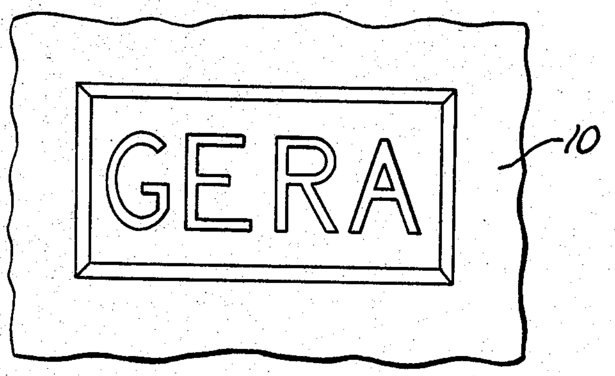
FIG. 1 is a heat transfer sheeting combination made in accordance with the subject invention and applied to an article.

FIG. 1 shows a heat transfer sheeting combination made in accordance with the subject invention applied to an article 10, such as a fabric, making up an article of clothing. The heat transfer portion is defined by the letters GERA and the surrounding rectangular border.

Figure 2:
FIG. 2 is an enlarged fragmentary cross-sectional view of one embodiment of the instant invention.
Figure 3:
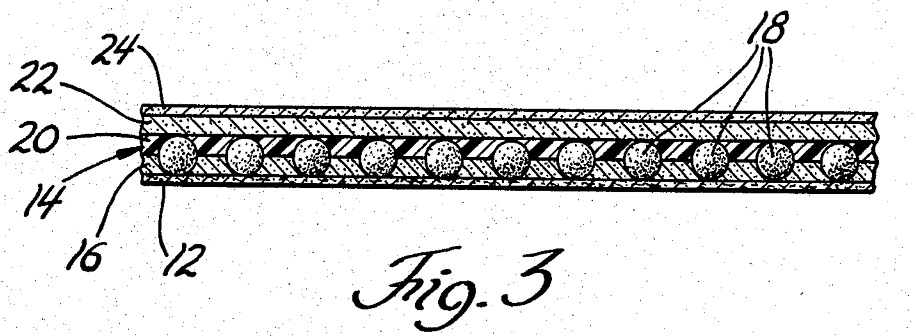
FIG. 3 is a fragmentary cross-sectional view of a second embodiment of a heat transfer sheeting constructed in accordance with the instant invention.

Two embodiments of the subject heat transfer sheeting combination are shown in cross section in FIGS. 2 and 3, respectively, in the configuration of the transfers before they are applied to an article. Common numbers are used to indicate similar components of each embodiment.

The heat transfer sheeting includes an absorbent substrate 12. The substrate 12 may comprise a layer of fibrous material, the fibrous material consisting of paper. The fibrous material is absorbent, the function of which will be described below. The substrate 12 may include other layers for the purpose of either stabilizing the substrate or protecting the substrate from environmental contamination, such as moisture.

A design coating, generally indicated at 14, is disposed on the substrate 12. As shown in FIG. 3, the design coating may include a particle carrier layer 16 disposed in a predetermined pattern over the substrate 12 and a layer of reflective particles 18 partially disposed in the carrier layer 14. The carrier layer 16 may comprise a mixture of tack wax and solvent, i.e., mineral spirits and preferably oleum. The carrier layer 16 is responsive to heat for melting and being absorbed by the fibrous substrate layer 12 when the transfer is being applied to an article 10. The reflective particles 18 may be spherical glass beads 18 which are partially disposed or embedded within the carrier layer 16. The beads 18 are in engagement with the substrate 12 and have portions disposed over the carrier layer 16.

The design coating 14 further includes an acrylic color ink 20 disposed over the reflective particles 18. A white back coat 22 is disposed over the acrylic color ink 20. The white back coat 22 includes a phenolic acrylic white ink. Alternatively, a single acrylic color coat 18 may be used alone.

As shown in FIG. 2, the transfer may only include an acrylic color ink 20 disposed over the substrate 12. Alternatively, a lithographic ink may be used. A white backing coat may be disposed over the color ink layer 20. An adhesive layer 24 is disposed on the design coating 14 and is responsive to heat and pressure for adhesively securing the design coating 14 to the article 10. The heat transfer sheeting combination is characterized by the adhesive layer 24 being a paste including a nylon resin and a polyester resin and an epoxy resin. The paste includes an acrylic emulsion for maintaining the resins in a suspension. The paste may also include thickening means for thickening the paste. The thickening means includes an aqueous solution of a polymeric acrylic salt, such as sodium polyacrylate. Preferably, Acrysol Thickener, manufactured by Rohn & Haas Co., is used. Water may be added to thin out the paste so as to maintain the resin particles in a desired suspension.

A paste composition comprehended by the subject invention can be made by mixing the following, by weight:

(1) 3 to 9 parts of a mixture containing the nylon resin, the polyester resin and the epoxy resin in substantially equal amounts;

(2) 1 to 3 parts of the acrylic emulsion; and (3) 2 to 6 parts water;

(4) 0.4 to 1.3 ounces of the polymeric acrylic salt per each pound of the above.

An example of a paste made in accordance with the instant invention includes, by weight, (1) 3 parts of the mixture containing the nylon resin, the epoxy resin and the polyester resin in substantially equal amounts;
(2) 1 part of the acrylic emulsion;
(3) 2 parts water; and
(4) 0.875 ounces of Acrysol Thickener per each pound of the above.

The polyester resin may have a grain size between 0 and 200 microns and, preferably, between 0 and 60 microns. The epoxy resin may have a grain size between 0 and 200 microns and, preferably, a grain size between 0 and 60 microns. The nylon resin may have a grain size between 0 and 300 microns and, preferably, between 0 and 60 microns. The selection of the grain size of each of the aforementioned resins depends upon the desired consistency and use of the paste. For example, a fine grained resin will produce a thinner adhesive layer. Therefore, to increase the final thickness of the adhesive layer, a larger grain size of each of the resins may be used.

Preferably, 3M Scotchcast No. 265 Epoxy Resin is used having a melting range between 300° to 355° F. Rislan H005 Nylon Resin is used having a similar melting range. Eastman Kodak F.A. 250 Polyester Resin having a melting range of 250° to 300° F. is also used. These resins are preferred since each resin has a similar melting range to the other two resins. Accordingly, a uniform setting of the three components of the paste is insured by application of a temperature between 200° and 300° F.

The paste may include an alkali for adjusting the pH of the paste. Generally, ammonia is used for adjusting the pH of the composition.

Each of the ingredients of the adhesive paste made in accordance with the instant invention imparts a desired feature or function to the adhesive. The nylon resin provides good flexibility to the adhesive layer, the polyester resin provides strength characteristics, and the epoxy resin provides good wetting out and adhesion characteristics to the paste.

The benefits of the instant invention are that the paste is much cleaner to work with and requires no cleaning of the printed heat transfer sheetings once the adhesive is applied to remove excessive adhesive. The paste improves flexibility, adhesion, and compatibility of the adhesive to the acrylic ink. After printing the paste over the acrylic ink, the acrylic emulsion in the paste settles to the ink layer that it has been printed over, thereby providing good adhesion of the adhesive to the printed surface. When heat is applied to the transfer, the resins melt and leach out the acrylic emulsion that they are mixed in and the acrylic is leached into the garment. The acrylic web that is attached to the ink layer and to the adhesive makes the adhesive more flexible because it separates small adhesion domains with a thin flexible layer of acrylic. A further benefit is that the paste may be printed over a single layer of acrylic ink ensuring a uniform layer of adhesive from edge to edge over the ink which has been a problem achieving with prior art adhesives such as adhesive dust, as less dust sticks to the areas where the ink layer is thinnest. The ink layer being thinnest around the edges of the transfer, the dust is less effective at an edge. Such a problem is also encountered where the ink is printed in fine lines. Further, the thickness of the adhesive in paste form can be controlled by the silk screen used to apply it. The paste method also allows the printing of multiple colors without the need to print an overall background coat. As the adhesive paste is basically invisible, it may be printed slightly larger than the color coats it is printed over to ensure adhesion of all edges.

The instant invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The embodiments of the invention in which an exclusive property or privilege is claimed are defined as follows:

1. A heat transfer sheeting combination of the type for being applied onto a fibrous article (10) to imprint a design thereon, said combination comprising: a substrate (12); a design coating (14) disposed on said substrate (12); and an adhesive layer (24) disposed on said design coating (14) and being responsive to heat and pressure for adhesively securing said design coating (14) to the article (10) and said adhesive layer (24) being a paste including a nylon resin and a polyester resin and an epoxy resin, said paste including an acrylic emulsion for maintaining said resins in a suspension.

2. A combination as set forth in claim 1 wherein said paste including thickening means for thickening said paste.

3. A combination as set forth in claim 2 wherein said thickening means including an aqueous solution of a polymeric acrylic salt.

4. A combination as set forth in claim 3 wherein said adhesive layer including, by weight; 3 to 9 parts of a mixture containing said nylon resin, said epoxy resin, and said polyester resin in substantially equal amounts; 1 to 3 parts of said acrylic emulsion; 2 to 6 parts water; and 0.4 to 1.3 ounces of said polymeric acrylic salt per each pound of said combination.

5. A combination as set forth in claim 4 wherein said adhesive layer including, by weight; 3 parts of said mixture, 1 part of said acrylic emulsion, 2 parts water; and 0.875 ounces of said polymeric acrylic salt per each pound of said combination.

6. A combination as set forth in claim 3 or 5 wherein by said polymeric acrylic salt being sodium polyacrylate.

7. A combination as set forth in claim 1 or 5 wherein said polyester resin having a grain size between 0 and 200 microns, said epoxy resin having a grain size between 0 and 200 microns, and said nylon resin having a grain size between 0 and 300 microns.

8. A combination as set forth in claim 7 wherein said polyester resin having a grain size between 0 and 60 microns.

9. A combination as set forth in claim 7 wherein said epoxy resin having a grain size between 0 and 60 microns.

10. A combination as set forth in claim 7 wherein said nylon resin having a grain size between 0 and 60 microns.

11. A combination as set forth in claim 1 wherein said paste including an alkali for adjusting the pH of said paste.

12. A combination as set forth in claim 11 wherein said alkali being ammonia.

13. A combination as set forth in claim 1 wherein said substrate including a fibrous material.

14. A combination as set forth in claim 13 wherein said fibrous material consisting of paper.

15. A combination as set forth in claim 13 wherein said design coating including a particle carrier layer (14) disposed in a predetermined pattern over said substrate (12) and a layer of reflective particles (16) partially disposed in said carrier layer (14).

16. A combination as set forth in claim 15 wherein said design coating including an acrylic color ink (18) disposed between said reflective particles (16) and said adhesive layer (22).

17. A combination as set forth in claim 16 wherein including a white backing coat (20) disposed between said acrylic color ink (18) and said adhesive layer (22).

18. A combination as set forth in claim 1 wherein including an acrylic color ink (18).

19. A combination as set forth in claim 19 wherein including a white backing coat (20) disposed between said acrylic color ink (18) and said adhesive layer (22).

20. A combination as set forth in claim 19 wherein said white backing coat (20) including a phenolic acrylic white ink.

* * * * *